Figure 4:
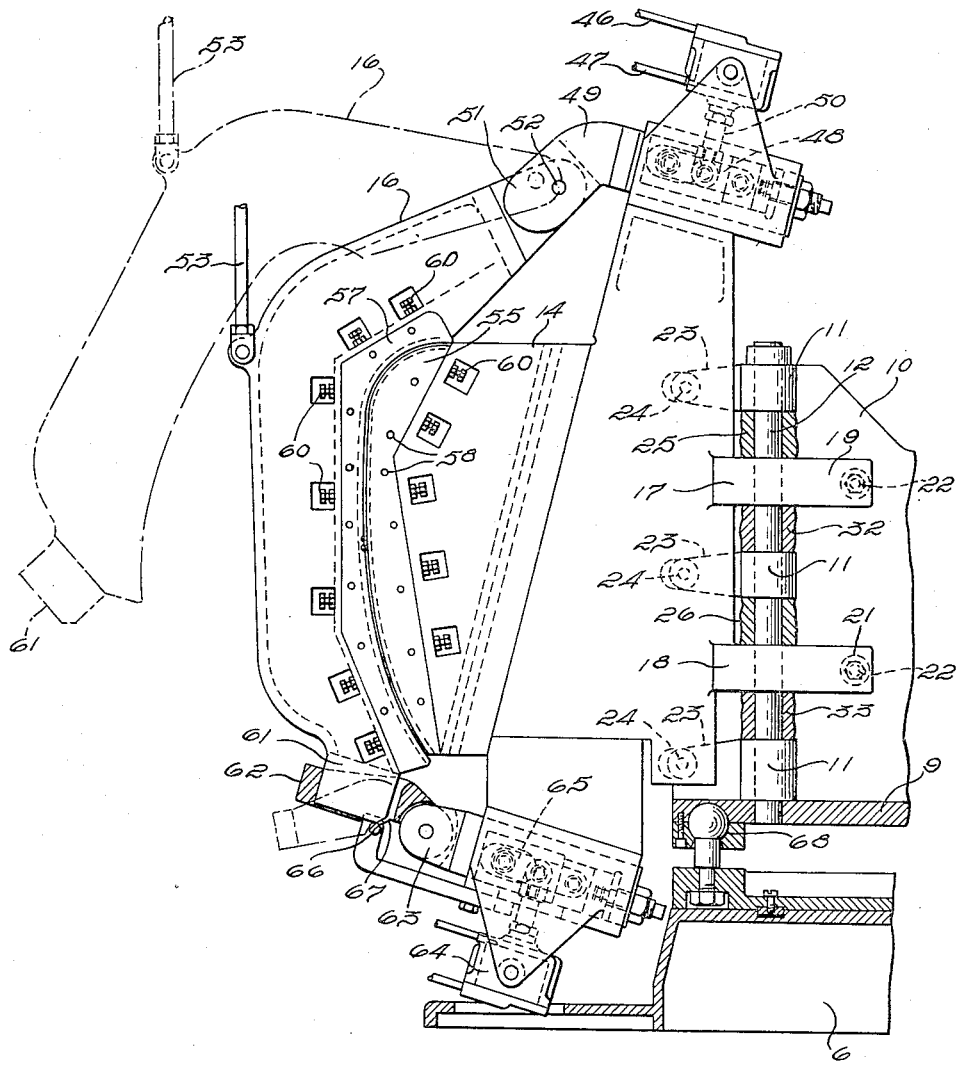

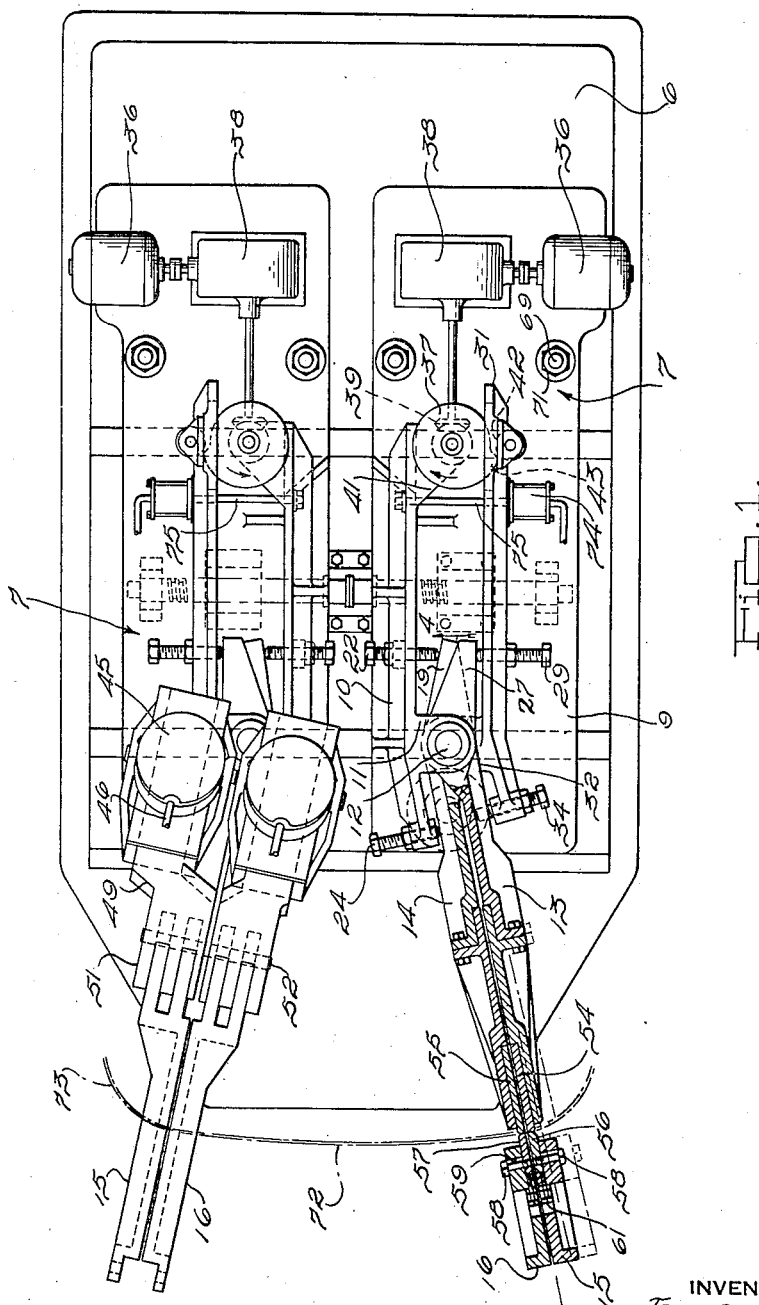

Sept. 11, 1934.  J. VEHKO  1,973,159
BUTT WELDING MACHINE
Filed Feb. 1, 1932  3 Sheets-Sheet 2
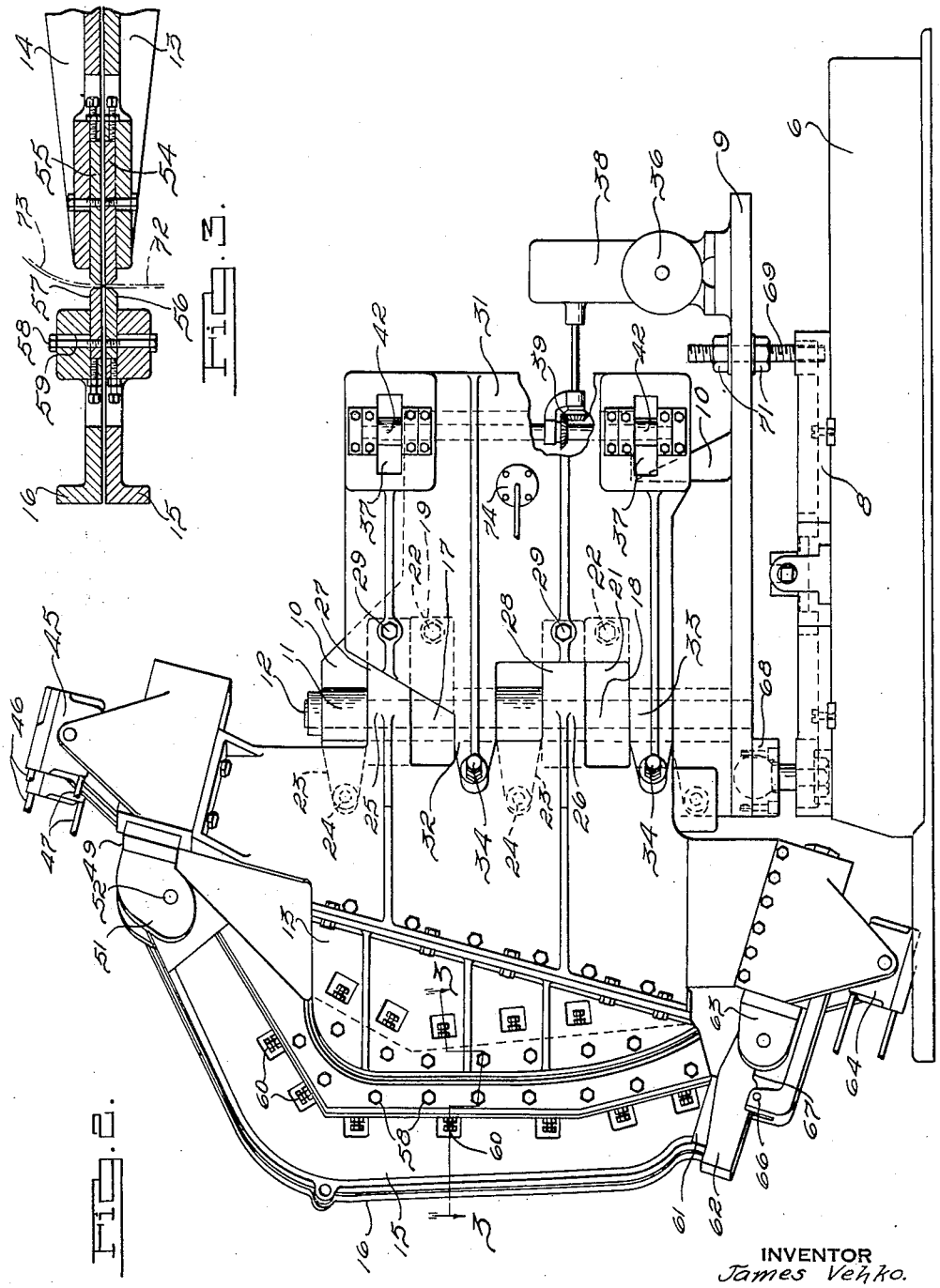
INVENTOR
James Vehko.
BY
Harness, Dickey, Pierce & Hann.
ATTORNEYS Patented Sept. 11, 1934

1,973,159

UNITED STATES PATENT OFFICE 1,973,159

BUTT WELDING MACHINE

James Vehko, Detroit, Mich., assignor to The Murray Corporation of America, a corporation of Delaware Application February 1, 1932, Serial No. 590,178

21 Claims. (Cl. 219—4)

My invention relates to method and means for butt welding joints and particularly to a method and means for butt welding the joints of automotive vehicle panels in a manner to effect the exact alignment of the sheets forming the panels so as to provide smooth surfaces at the joints.

It has been the practice in the past to butt weld the side and rear panels of an automobile body by clamping the panels between jaw members having electrodes associated therewith, which are movable relative to each other for moving the panels into abutted relation for effecting a weld when current is applied to the electrodes to form joints at the abutted edges of the panels.

Difficulty has been experienced in the past when constructing welding machines to effect the exact alignment of the side and rear panels of the vehicle body, which thereby produced weak joints and joints which required patching to present a smooth outer finish to the body at the point at which the joint was made. This operation usually required the machining of a portion of one panel while the surface of the other panel was built up a predetermined amount to meet the surface of the machined portion to constitute a smooth surface at the junction of the panels. It is very apparent that this operation was exceedingly expensive and weakened the panel at the machined portion, which was objectionable.

In practicing my present invention, I provide a machine, for clamping and welding the panels which go to make up the body of the vehicle, that is vertically mounted so as to support the sheets in a position in which they will be disposed relative to a chassis of a vehicle. In the construction employed, very little movement of the supporting jaws is required to bring the panels in abutting relation. I am able to retain the alignment of the sheets under all conditions so that the surface of the joints will be in exact alignment and a dressing operation need only be employed to provide a smooth surface at the joint. The clamping elements are readily movable from contact with the assembled panels after the welding operation, so that the assembled structure may be readily removed from the machine and new panels to be welded, disposed to be engaged by the clamping members.

The machine is novel in providing two complete supporting, clamping and welding structures for the panels, each of which are tiltable about a support and adjustable relative to each other so that they may be accurately positioned to effect the welding of both joints at the same time and to have the joints in exact alignment.

In the preferred form, the clamping of the jaws is effected by hydraulic means and an electric motor is provided for moving the jaws toward each other through the actuation of cams which move the panels into abutted relation to effect the welding operation when current flows therethrough. The jaws are mounted for relative angular movement in a path conforming to the shape of the panels, to have the edges of the panels constantly aligned, during the welding operation.

The main objects of my invention are; to provide a machine for butt welding panels of an automotive body which is vertically disposed and which clamps the panels in such manner as to retain them in exact aligned relation during the butt welding operation; to provide a machine having individual clamping jaws and motor means for effecting their operation, all of which are tiltable about a point and movable relative to each other for effecting the exact alignment of the jaws so that two joints may be welded at precisely the same time; to provide current conducting jaws which receive and clamp the side edges of the rear panel of the vehicle body, adjacent to the edges of the side panels which are retained by additional jaws in exact aligned relation to the rear panel and which are relatively movable for moving the panel edges into abutting relation for effecting the welding of both joints at substantially the same instance as current is conducted to and from the edges of the panels; to provide clamping jaws which are movable away from the panel elements to permit the unit assembly to be moved from the machine; and, in general, to provide a butt welding machine for joining the elements of automotive vehicle bodies which is simple in construction and operation and which effects the exact alignment of the panels during the welding operation.

Other objects and features of novelty of my invention will be either specifically pointed out or will become apparent when referring, for a better understanding of my invention, to the following description in conjunction with the accompanying drawings, wherein:

Figure 1 is a plan view, partly in section, of a butt welding machine embodying features of my invention, Fig. 2 is a view, in side elevation, of the machine illustrated in Fig. 1, Fig. 3 is a sectional view of the structure illustrated in Fig. 2 taken on the line 3—3 thereof, and Fig. 4 is a sectional view of the structure illustrated in Fig. 1 taken on the line 4—4 thereof.

My invention comprises in general a base 6 having mounted thereon individual welding mechanisms 7 which are adjustable laterally of the base through the medium of movable platforms 8 which are a part of each unit welding device 7. Each platform 8 supports a table 9 which is provided with an upstanding web 10 having suitable bosses 11 for supporting a shaft 12. Pivoted to the shaft 12 are jaws 13 and 14 which are relatively movable toward and from each other, each jaw 13 and 14 being provided with a clamping jaw 15 and 16 having faces which are complementary to the faces provided on the jaws 13 and 14.

It is to be understood that the devices 7 are similar in construction except for their right and left hand disposition, and, accordingly, a single device will be described, which description will suffice for both of the devices. The jaw 14 is pivoted on the shaft 12 through the medium of the apertured bosses 17 and 18, having extensions 19 and 21 thereon which project into the path of the adjusting bolts 22 extending through the web 10. In a similar manner the bosses 11, on the upstanding web 10 of the table 9, are provided with extensions 23 in which adjusting bolts 24 are provided and which cooperate with the bolts 22 for retaining the jaws 14 in adjusted, fixed position and in prolongation of the web 10.

In like manner, the jaw 13 is pivoted on the shaft 12 through the medium of bosses 25 and 26 which likewise are provided with extending elements 27 and 28 to be engaged by bolts 29 carried by a movable member 31. The member 31 is likewise pivoted on the shaft 12 through the medium of bosses 32 and 33 which carry extensions through which bolts 34 project. The jaw 13 is retained in fixed extended relation to the movable member 31 by the bolts 29 and 34 which are adjusted, after the jaw 14 is positioned relative to the web 10, so as to position the jaw 13 relative thereto. The bolts 29 and 34 are tightened to clamp the jaws 13 in extension of the movable member 31 so that the movement of the member about the shaft 12 causes the jaw 13 to be moved toward or away from the jaw 14. It is to be understood that the jaws 13 and 14 may be constructed as a unit with the member 31 and web 10, respectively, when the adjusting feature is to be dispensed with.

For effecting the relative movement of the jaws, I provide a motor 36 which is connected to a cam 37 through the medium of a reduction gear train 38 and bevel gears 39 for operating the cam through one complete revolution during each welding operation. The cam and the driving shaft therefor, are mounted on an extension 41 of the web 10. A cam engaging member 42 is disposed on the member 31 so that, as the cam 37 is rotated, the member 31 will be moved away from the web 10 to move the jaw 13 toward the jaw 14.

On the top of each of the jaws 13 and 14 I provide individual hydraulic or pneumatically actuated rams 45 which are of conventional design having a piston therein which is actuated by a fluid medium conducted through the pipes 46 and 47 to and from the cylinders on opposite sides of the pistons. Piston rods 50 extend from the cylinders 45 and are utilized for controlling the position of toggles 48 which actuate sliding elements which are disposed angularly of the jaws 13 and 14 for effecting a lateral downward clamping pressure. Hinge ends 51 are provided on the elements 49 to which the jaws 15 and 16 are attached by pins 52 to permit the jaws to be pivoted thereabout. Rods 53 are pivoted on the jaws 15 and 16 and are hydraulically or otherwise actuated, to pull the jaws upwardly above the top of the panels which have been welded.

Each of the jaws, 13, 14, 15 and 16 are provided with electrodes 54, 55, 56 and 57, respectively, which are secured thereto by bolts 58 which project through elongated apertures 59 of the jaws for permitting the adjustment of the electrodes relative thereto. The jaws are provided with positioning screws 60 by which a predetermined adjustment of the electrodes relative to the jaws is effected. As viewed in Fig. 4, the electrodes are of predetermined contour conforming to the shape of the weld to be made. The electrodes 54 and 55 are provided with surfaces which are mated to the surfaces of the electrodes 56 and 57, the mated portions being of the contour of the panels to be welded.

Projections 61 on the lower end of the jaws 15 and 16 are received by clamping members 62 which are pivoted to arms 63, similar to the arms 49 above referred to, and which are actuated in the same manner by angularly disposed rams 64 through toggle systems 65. Pins or rollers 66 are provided adjacent to the path of movement of the members 62 which have sloping surfaces 67 in engagement therewith by which the members 62 are moved from the projections 61 to permit the jaws 15 and 16 to be moved upwardly through the actuation of the rods 53. It will be noted that the arms 49 and 63 are sloped relative to the vertical, to effect a lateral and downward clamping component to the jaws 15 and 16 for clamping the panels at the top and vertical arcuate surfaces thereof.

When the jaws 15 and 16 are dropped into position relative to the jaws 13 and 14, the actuation of the ram 64, the toggle 65 and arm 63, causes the member 62 to be moved upwardly into engagement with the projection 61, through the medium of the roller 66 and surface 67, to draw the lower end of the jaws 15 and 16 toward the jaws 13 and 14. The simultaneous actuation of the ram 45 moves the upper end of the jaws 15 and 16 toward the jaws 13 and 14.

The table 9 is positioned on the platforms 8 through the medium of a ball and socket connection 68 which permits each of the tables and the jaws, along with the motors and rams for effecting their operation, to be tilted in any plane thereabout. The adjustment is effected through a pair of screws 69 provided on the rear portion of the table 9, the position of the table being adjustable through the adjustment of nuts 71 provided thereon on each side of the table. Both of the devices are adjustable laterally of each other through the lateral movement of the platforms 8 effected by a lead screw in a well known manner.

Both of the devices 7 are first adjusted relative to each other to have the electrodes 54 and 55 disposed in such manner as to span the joints to be welded. That is to say, the center line between the jaws 54 and 55 on both devices are so spaced as to receive a back panel member 72 to have the edge thereof extend slightly beyond the jaws 55. Adjustment is likewise made to the electrodes 54, 55, 56 and 57 in both devices to have all the edges thereof positioned in a predetermined plane and both devices are tilted about the knuckle joint 68 to dispose the electrodes in vertical planes which bear a definite relation to each other.

The operation of my device will now be described. Assume the jaws to be in open position, that is to say, the jaws 13 are moved away from the jaws 14 and the jaws 15 and 16 are moved to raised position. A panel 72 is positioned against the electrodes 55 and the jaws 16 are dropped into engagement with the panel and moved into clamped relation therewith through the actuation of the rams 45 and 64 for adjusting the members 49 and 63 inwardly of the machine to draw the jaws 16 inwardly to clamp the edges of the panel 72 between the electrodes 55 and 57. Side panels 73 are then positioned on the side of the devices 7 to have the edge thereof engage the electrode 54. The jaws 15 are dropped to have the electrode 56 thereof engage the opposite side of the panels to clamp them firmly between the electrodes when the adjacent sets of members 49 and 63 are drawn inwardly by the action of the associated rams. It is to be understood that suitable positioning and holding means may be provided for securing the panels in position and a suitable control system employed for moving the jaws and effecting the welding operation.

The motors 38 are then actuated to revolve the cams 37 to have the camming surfaces 53 thereof pass over the member 42 to force the member 31 away from the flange 10 to thereby force the jaws 13 and 15 toward the jaws 14 and 16, respectively, to effect the engagement of the ends of the panels 72 and 73. As current passes through the electrodes 54, 55, 56 and 57, and the edges of the panels, the joints to be formed are butt welded in a well known manner. After the camming surface 43 of the cam passes beyond the member 42 of the device, current to the electrodes is cut off in any well known manner. The jaws 15 and 16 are then raised and the welded panels are removed from the machine.

Fluid actuated cylinders 74 are mounted on the members 31, having pistons therein which are connected through rods 75 to the flanges 10. A fluid is conducted to the cylinders 74 after the jaws 15 and 16 have been moved to raised position and the panels have been removed from the device, for moving the jaws 13 away from the jaws 14. Thereafter a new set of panels 72 and 73 are assembled in the above described manner relative to the electrodes 54 and 55 and clamped thereagainst by electrodes 56 and 57 after which the jaws 13 and 15 are moved toward the jaws 14 and 16 through the actuation of the motor and the cams 37 to again bring the ends of the panels 73 and 72 into engagement to complete a circuit through the electrodes 54, 55, 56 and 57 to thereby effect the butt welding of the panels.

In view of the accurate adjustment of the machine to position the jaws in exact alignment with each other and disposed a minimum distance from the ends of the panels, the exact alignment of the panels is thereby effected which alignment is retained during the welding operation. In this manner, the surfaces of the panels at the welded joints are in exact alignment and smooth joints are always obtained which thereby eliminates the scrapping of the material or the fudging of the surfaces to provide a smooth appearance to the outer portion of the panels at the joint, as has been the practice heretofore.

The adjustment of the welding devices relative to each other on a single base as well as the interchangeability and the adjustability of the electrodes in the jaws and the adjustment of the jaws relative to the actuating portion thereof, permit the particular welding machine to be capable of welding substantially any shape or size of rear and side panels in the manner referred to hereinabove. A single machine, constructed in accordance with my invention, may be utilized for effecting the joining of panels on various models and sizes of automotive vehicle bodies.

While I have described and illustrated but a single embodiment of my invention, it will be apparent to those skilled in the art that various changes, omissions, additions and substitutions may be made therein without departing from the spirit or scope of my invention, as set forth in the accompanying claims.

I claim as my invention:

1. A butt welding machine including, in combination, a supporting pillar, jaws hinged thereto of a length conforming to a radius of curvature of the element to be welded, clamping elements carried by said jaws, and means for arcuately moving said jaws relative to each other to feed the element to be welded in the plane of its curvature.

2. A butt welding machine including, in combination, jaw members for securing arcuate elements to be welded in aligned relation and relatively pivoted substantially at the center of curvature of said elements to retain said alignment when said jaws are arcuately moved toward each other.

3. A butt welding machine including, in combination, jaw members which are supported for relative pivotal movement on an arc conforming to the curvature of panels to be welded, electrodes mounted thereon of a shape conforming to the shape of the panels to be welded, means for clamping said panels to said jaw members, and means for arcuately moving said jaw members toward each other to effect the butt welding of the panels in plane of curvature thereof.

4. A butt welding machine including, in combination, a pair of jaws which are mounted for relative pivotal movement toward and away from each other, means carried by said jaws for securing a panel relative thereto with the ends projecting in aligned relation, and camming means for moving said jaws toward each other on an arc substantially that of the finished panel for retaining said panels aligned while moved in their plane of curvature during the butt welding operation.

5. A butt welding machine including, in combination, two sets of pairs of relatively movable jaws, with at least one jaw of each pair pivotally mounted for movement on an arc substantially that of the panel to be welded, means for clamping the panels to said jaws to have the ends thereof projecting therefrom in aligned relation, current conductors connected to said panels and camming means for moving said jaws toward each other in their plane of curvature and controlling the current for effecting the butt welding operation.

6. A butt welding machine including, in combination, two sets of pairs of relatively movable jaws, with at least one jaw of each pair pivotally mounted for movement in an arcuate path substantially that of the panel to be welded, electrodes on said jaws, means for clamping the panel to said electrodes to have the ends thereof project therefrom in aligned relation, current conductors connected to said electrodes, means for moving said jaws toward each other in their plane of curvature for effecting the butt welding operation, and means for controlling the flow of current to said electrodes.

7. A butt welding machine for curved panels including, in combination, jaws mounted for relative pivotal movement on an arc conforming to the curvature of said panel, hinged jaws carried thereby, electrodes on said jaws complementally formed of a shape conforming to the shape of the panels to be welded, means for raising and lowering said hinged jaws, means for clamping said hinged jaws relative to the jaws mounted for relative pivotal movement, and means for moving the last said jaws relative to each other for advancing said panels in their planes of curvature.

8. A butt welding machine for curved panels including, in combination, jaws mounted for relative pivotal movement on an arc conforming to the curvature of said panel, hinged jaws carried thereby, electrodes on said jaws complementally formed of a shape conforming to that of the panels to be welded, means for raising and lowering said hinged jaws, means for moving said hinged jaws in a direction to clamp all points of said panel relative to the jaws which are mounted for relative pivotal movement, and means for moving said last jaws relative to each other for advancing said panels in their planes of curvature.

9. A machine for welding panels including, in combination, jaw members relatively movable laterally of each other, clamping jaws hingedly mounted thereon, and means for engaging the opposite end of said hinged jaws for moving said hinged jaws toward said relatively movable jaws, means for moving the hinged end of said jaw toward said relatively movable jaw, both of said means working in conjunction with each other for effecting lateral and downward components of movement for clamping all points of the panel between said jaws.

10. A butt welding machine including, in combination, jaw members for securing an arcuate element to be welded in aligned relation with a second element and mounted for relatively pivotal movement to retain said alignment in the plane of said arc as said jaws are moved toward each other, electrodes on said jaws, and camming means for moving said jaws toward each other and for controlling a flow of current through said electrodes.

11. A butt welding machine including, in combination, jaw members for securing elements in alignment at least one of which is of arcuate form and mounted for relative pivotal movement to retain said alignment in the plane of said arc as said jaws are moved toward each other, electrodes on said jaws and means for effecting the adjustment of said electrodes relative to said jaws.

12. A butt welding machine including, in combination, jaw members for securing arcuate elements to be welded in aligned relation and mounted for relative pivotal movement to retain said alignment in the plane of said arc as said jaws are moved toward each other, camming means for effecting the relative movement between said jaws, and means for driving said cam through 360 degrees of movement.

13. A butt welding machine including, in combination, jaw members for securing an arcuate element to be welded in aligned relation with a second element and mounted for relative pivotal movement to retain said alignment as said jaws are moved toward each other, a camming element for effecting the movement of said jaws, motor means for effecting the single rotation of said cam to cause the closing of the jaws and the welding of the elements, and means for opening said jaws after the welded elements have been removed therefrom.

14. A butt welding machine including, in combination, jaw members for securing elements to be welded in aligned relation and mounted for relative pivotal movement to retain said alignment as said jaws are moved toward each other, hinged jaws supported by said jaw members for clamping panels therebetween, means for engaging and drawing the unhinged portion of the hinged jaws toward the jaw members, means for moving the hinged ends of the hinged jaws, said means effecting a downward and lateral component of movement of the hinged jaws toward the jaw members for securely clamping all points of the panels therebetween.

15. A butt welding machine including, in combination, jaw members for securing elements to be welded in aligned relation and mounted for relative pivotal movement to retain said alignment as said jaws are moved toward each other, hinged jaws supported by said jaw members for clamping panels therebetween, means for engaging and drawing the unhinged portion of the jaw toward the jaw members, means for moving the hinged ends of the hinged jaws, said means effecting a downward and lateral component of movement of the hinged jaws toward the jaw members for clamping all points of the panels therebetween, and a cam for moving said jaw members and hinged jaws toward each other during a single rotation thereof for effecting the welding of the panel as current flows therethrough.

16. A butt welding machine including, in combination, jaw members for securing elements to be welded in aligned relation and mounted for relative pivotal movement to retain said alignment as said jaws are moved toward each other, hinged jaws supported by said jaw members for clamping panels therebetween, means for engaging and drawing the unhinged portion of the jaw toward the jaw members, means for moving the hinged ends of the hinged jaws, said means effecting a downward and lateral component of movement of the hinged jaws toward the jaw members for clamping all points of the panels therebetween, a cam for moving said jaw members and hinged jaws toward each other during a single rotation thereof for effecting the welding of the panels as current flows therethrough, means for releasing said moving means, and means for raising said hinged jaws.

17. A butt welding machine including, in combination, jaw members for securing elements to be welded in aligned relation and mounted for relative pivotal movement to retain said alignment as said jaws are moved toward each other, hinged jaws supported by said jaw members for clamping panels therebetween, means for engaging and drawing the unhinged portion of the jaw toward the jaw members, means for moving the hinged ends of the hinged jaws, said means effecting a downward and lateral component of movement of the hinged jaws toward the jaw members for clamping all points of the panels therebetween, a cam for moving said jaw members and hinged jaws toward each other during a single rotation thereof for closing said jaws and effecting the welding of the panels as current flows therethrough, means for releasing said moving means, means for raising said hinged jaws, and means for opening said jaw members after the welded panels are released therefrom.

18. A machine for welding the joints of arcuate panels including, in combination, a unit base, laterally adjustable platforms on said base, vertically disposed jaws on said platform for receiving the edges of the panels, electrodes on said jaws for engaging said panels, means for arcuately moving said jaws in the plane of curvature of said panels toward each other for bringing the ends of the panels into abutted relation to each other, and means for effecting the welding of the abutted ends of the panels which includes the passage of a current of predetermined intensity through said electrodes and panels.

19. A machine for effecting the butt welding of panels which includes, in combination, a base, laterally adjustable platforms carried by said base, vertically disposed hinge elements mounted in pivotal relation to said platforms, electrodes carried by said hinge elements of a contour conforming to the shape of the panels to be welded, complementary electrodes disposed adjacent to the hinge electrodes for clamping a panel element relative thereto and in substantially aligned relation to each other, and means for moving said panels in an arcuate path conforming to the curvature of said panels into abutted relation to effect the butt welding of the edges when a current is passed through the electrodes.

20. A machine for effecting the butt welding of curved panels which includes, in combination, a base, laterally adjustable platforms carried by said base, elements pivoted to said platforms, relatively adjustable jaws carried by said elements, clamping jaws carried by said jaws and adjustable relative thereto for clamping the panels therebetween, electrodes provided on said jaws and movable into intimate engagement with the panels during the clamping operation, means for moving said jaws in an arcuate path conforming to the curvature of said panels relative to each other for moving the edges of the panel into aligned abutting relation, and means for passing a current through said electrodes and abutted edges of the panel for effecting the butt welding of the panels during such aligned movement.

21. A machine for effecting the butt welding of panels which includes, in combination, a base, laterally adjustable platforms carried by said base, elements pivotally supported on said platforms, pairs of clamping electrodes pivotally mounted on said elements for clamping the panels therebetween, means for relatively advancing said pairs of electrodes in an arcuate path toward each other, means for passing a current through said panels when they are moved into abutted relation for effecting the welding thereof in said arcuate path as they are further moved, and means for raising said clamping jaws out of contact with said panels after the welding operation.

JAMES VEHKO.